· US007111899B2

United States Patent
Gray

(10) Patent No.: US 7,111,899 B2
(45) Date of Patent: Sep. 26, 2006

(54) STRUCTURAL REINFORCEMENT MEMBER AND METHOD OF USE THEREFOR

(75) Inventor: Todd Gray, Troy, MI (US)

(73) Assignee: L & L Products, Inc., Romeo, MI (US)

( * ) Notice: Subject to any disclaimer, the term of this patent is extended or adjusted under 35 U.S.C. 154(b) by 53 days.

(21) Appl. No.: 10/822,406

(22) Filed: Apr. 12, 2004

(65) Prior Publication Data

US 2004/0227377 A1     Nov. 18, 2004

Related U.S. Application Data

(60) Provisional application No. 60/464,712, filed on Apr. 23, 2003.

(51) Int. Cl.
*B62D 25/00*     (2006.01)
(52) U.S. Cl. .................................. 296/187.02
(58) Field of Classification Search ........... 296/187.02, 296/187.01, 187.03, 187.12, 193.05, 193.06, 296/203.01, 203.03
See application file for complete search history.

(56) References Cited

U.S. PATENT DOCUMENTS

| | | | |
|---|---|---|---|
| 3,162,086 A | 12/1964 | Wells et al. | |
| 4,463,870 A | 8/1984 | Coburn, Jr. et al. | |
| 4,610,836 A | 9/1986 | Wycech | |
| 4,751,249 A | 6/1988 | Wycech | |
| 4,769,391 A | 9/1988 | Wycech | |
| 4,810,548 A | 3/1989 | Ligon, Sr. et al. | |
| 4,813,690 A | 3/1989 | Coburn, Jr. | |
| 4,836,516 A | 6/1989 | Wycech | |
| 4,853,270 A | 8/1989 | Wycech | |
| 4,861,097 A | 8/1989 | Wycech | |
| 4,901,500 A | 2/1990 | Wycech | |
| 4,922,596 A | 5/1990 | Wycech | |
| 4,923,902 A | 5/1990 | Wycech | |
| 4,978,562 A | 12/1990 | Wycech | |
| 5,124,186 A | 6/1992 | Wycech | |
| 5,266,133 A | 11/1993 | Hanley et al. | |
| 5,358,397 A | 10/1994 | Ligon et al. | |
| 5,474,721 A | 12/1995 | Stevens | |
| 5,506,025 A | 4/1996 | Otto et al. | |
| 5,575,526 A | 11/1996 | Wycech | |
| 5,631,027 A | 5/1997 | Takabatake | |
| 5,642,914 A | 7/1997 | Takabatake | |
| 5,678,826 A | 10/1997 | Miller | |
| 5,725,272 A | 3/1998 | Jones | |
| 5,755,486 A | 5/1998 | Wycech | |
| 5,766,719 A | 6/1998 | Rimkus | |
| 5,829,482 A | 11/1998 | Takabatake | |
| 5,884,960 A | 3/1999 | Wycech | |
| 5,888,600 A | 3/1999 | Wycech | |
| 5,932,680 A | 8/1999 | Heider | |

(Continued)

FOREIGN PATENT DOCUMENTS

DE     299 04 705 U1     7/1999

(Continued)

OTHER PUBLICATIONS

Copending U.S. Appl. No. 09/631,211, filed Aug. 3, 2000.

(Continued)

*Primary Examiner*—H Gutman
(74) *Attorney, Agent, or Firm*—Dobrusin & Thennisch PC

(57) ABSTRACT

A structural reinforcement member include a carrier member and a reinforcement material disposed upon the carrier member. The reinforcement member also includes at least one locating member. The reinforcement member has been found particularly useful for forming a structural system for articles of manufacture such as automotive vehicles.

27 Claims, 5 Drawing Sheets

U.S. PATENT DOCUMENTS

| | | |
|---|---|---|
| 5,937,486 A | 8/1999 | Bockenheimer |
| 5,985,435 A | 11/1999 | Czaplicki et al. |
| 5,992,923 A | 11/1999 | Wycech |
| 6,003,274 A | 12/1999 | Wycech |
| 6,006,484 A | 12/1999 | Geissbuhler |
| 6,033,300 A | 3/2000 | Schneider |
| 6,059,342 A | 5/2000 | Kawai et al. |
| 6,068,424 A | 5/2000 | Wycech |
| 6,079,180 A | 6/2000 | Wycech |
| 6,092,864 A | 7/2000 | Wycech et al. |
| 6,093,358 A | 7/2000 | Schiewe et al. |
| 6,096,403 A | 8/2000 | Wycech |
| 6,099,948 A | 8/2000 | Paver, Jr. |
| 6,103,341 A | 8/2000 | Barz et al. |
| 6,131,897 A | 10/2000 | Barz et al. |
| 6,146,565 A | 11/2000 | Keller |
| 6,149,227 A | 11/2000 | Wycech |
| 6,150,428 A | 11/2000 | Hanley, IV et al. |
| 6,165,588 A | 12/2000 | Wycech |
| 6,168,226 B1 | 1/2001 | Wycech |
| 6,189,953 B1 | 2/2001 | Wycech |
| 6,196,621 B1 | 3/2001 | VanAssche et al. |
| 6,199,940 B1 | 3/2001 | Hopton et al. |
| 6,207,244 B1 | 3/2001 | Hesch |
| 6,233,826 B1 | 5/2001 | Wycech |
| 6,237,304 B1 | 5/2001 | Wycech |
| 6,253,524 B1 | 7/2001 | Hopton et al. |
| 6,263,635 B1 | 7/2001 | Czaplicki |
| 6,270,600 B1 | 8/2001 | Wycech |
| 6,272,809 B1 | 8/2001 | Wycech |
| 6,276,105 B1 | 8/2001 | Wycech |
| 6,281,260 B1 | 8/2001 | Hanley, IV et al. |
| 6,287,666 B1 | 9/2001 | Wycech |
| 6,296,298 B1 | 10/2001 | Barz |
| 6,305,136 B1 | 10/2001 | Hopton et al. |
| 6,311,452 B1 | 11/2001 | Barz et al. |
| 6,315,938 B1 | 11/2001 | Jandali |
| 6,319,964 B1 | 11/2001 | Blank et al. |
| 6,321,793 B1 | 11/2001 | Czaplicki et al. |
| 6,332,731 B1 | 12/2001 | Wycech |
| 6,341,467 B1 | 1/2002 | Wycech |
| 6,357,819 B1 | 3/2002 | Yoshino |
| 6,358,584 B1 | 3/2002 | Czaplicki |
| 6,368,438 B1 | 4/2002 | Chang et al. |
| 6,372,334 B1 | 4/2002 | Wycech |
| D457,120 S | 5/2002 | Broccardo et al. |
| 6,382,635 B1 | 5/2002 | Fitzgerald |
| 6,383,610 B1 | 5/2002 | Barz et al. |
| 6,387,470 B1 | 5/2002 | Chang et al. |
| 6,389,775 B1 | 5/2002 | Steiner et al. |
| 6,406,078 B1 | 6/2002 | Wycech |
| 6,413,611 B1 | 7/2002 | Roberts et al. |
| 6,419,305 B1 | 7/2002 | Larsen |
| 6,422,575 B1 | 7/2002 | Czaplicki et al. |
| 6,435,601 B1 | 8/2002 | Takahara |
| H2047 H | 9/2002 | Harrison et al. |
| 6,444,713 B1 | 9/2002 | Pachi et al. |
| 6,451,231 B1 | 9/2002 | Harrison et al. |
| 6,455,146 B1 | 9/2002 | Fitzgerald |
| 6,467,834 B1 | 10/2002 | Barz et al. |
| 6,471,285 B1 | 10/2002 | Czaplicki et al. |
| 6,474,722 B1 | 11/2002 | Barz |
| 6,474,723 B1 | 11/2002 | Czaplicki et al. |
| 6,475,577 B1 | 11/2002 | Hopton et al. |
| 6,482,486 B1 | 11/2002 | Czaplicki et al. |
| 6,482,496 B1 | 11/2002 | Wycech |
| 6,491,336 B1 | 12/2002 | Beckmann et al. |
| 6,502,821 B1 | 1/2003 | Schneider |
| 6,519,854 B1 | 2/2003 | Blank |
| 6,523,857 B1 | 2/2003 | Hopton et al. |
| 6,523,884 B1 | 2/2003 | Czaplicki et al. |
| 6,546,693 B1 | 4/2003 | Wycech |
| 6,550,847 B1 * | 4/2003 | Honda et al. ............ 296/146.6 |
| 6,561,571 B1 | 5/2003 | Brennecke |
| 6,573,309 B1 | 6/2003 | Reitenbach et al. |
| 6,575,526 B1 | 6/2003 | Czaplicki et al. |
| 6,607,238 B1 | 8/2003 | Barz |
| 6,619,727 B1 | 9/2003 | Barz et al. |
| 6,634,698 B1 | 10/2003 | Kleino |
| 6,641,208 B1 | 11/2003 | Czaplicki et al. |
| 6,668,457 B1 | 12/2003 | Czaplicki |
| 6,691,468 B1 | 2/2004 | Helferty |
| 6,692,347 B1 | 2/2004 | Schneider |
| 6,708,979 B1 | 3/2004 | Stratman et al. |
| 6,722,720 B1 | 4/2004 | Donick et al. |
| 6,729,425 B1 | 5/2004 | Schneider et al. |
| 6,748,667 B1 | 6/2004 | Sevastian |
| 6,777,049 B1 | 8/2004 | Sheldon et al. |
| 6,786,533 B1 | 9/2004 | Bock et al. |
| 6,793,274 B1 | 9/2004 | Riley et al. |
| 6,811,864 B1 | 11/2004 | Czaplicki et al. |
| 6,817,654 B1 | 11/2004 | Kitagawa et al. |
| 6,820,923 B1 | 11/2004 | Bock |
| 6,846,559 B1 | 1/2005 | Czaplicki et al. |
| 6,851,232 B1 | 2/2005 | Schwegler |
| 6,855,652 B1 | 2/2005 | Hable et al. |
| 6,887,914 B1 | 5/2005 | Czaplicki et al. |
| 6,890,021 B1 | 5/2005 | Bock et al. |
| 6,905,745 B1 | 6/2005 | Sheldon et al. |
| 6,920,693 B1 | 7/2005 | Hankins et al. |
| 6,921,130 B1 | 7/2005 | Barz et al. |
| 6,923,499 B1 | 8/2005 | Wieber et al. |
| 6,928,736 B1 | 8/2005 | Czaplicki et al. |
| 6,932,421 B1 | 8/2005 | Barz |
| 6,938,947 B1 | 9/2005 | Barz et al. |
| 6,941,719 B1 | 9/2005 | Busseuil et al. |
| 6,953,219 B1 | 10/2005 | Lutz et al. |
| 6,955,593 B1 | 10/2005 | Lewis et al. |
| 2001/0020794 A1 | 9/2001 | Ishikawa |
| 2001/0042353 A1 | 11/2001 | Honda et al. |
| 2002/0053179 A1 | 5/2002 | Wycech |
| 2002/0074827 A1 | 6/2002 | Fitzgerald et al. |
| 2002/0160130 A1 | 10/2002 | Sheldon et al. |
| 2002/0174954 A1 | 11/2002 | Busseuil et al. |
| 2003/0001469 A1 | 1/2003 | Hankins et al. |
| 2003/0039792 A1 | 2/2003 | Hable et al. |
| 2003/0050352 A1 | 3/2003 | Guenther et al. |
| 2003/0057737 A1 | 3/2003 | Bock et al. |
| 2003/0069335 A1 | 4/2003 | Czaplicki et al. |
| 2003/0090129 A1 | 5/2003 | Riley et al. |
| 2003/0140671 A1 | 7/2003 | Lande et al. |
| 2003/0144409 A1 | 7/2003 | Kassa et al. |
| 2003/0176128 A1 | 9/2003 | Czaplicki et al. |
| 2003/0183317 A1 | 10/2003 | Czaplicki et al. |
| 2003/0184121 A1 | 10/2003 | Czaplicki et al. |
| 2003/0186049 A1 | 10/2003 | Czaplicki et al. |
| 2003/0201572 A1 | 10/2003 | Coon et al. |
| 2003/0218019 A1 | 11/2003 | Le Gall et al. |
| 2004/0011282 A1 | 1/2004 | Myers et al. |
| 2004/0018341 A1 | 1/2004 | Richardson et al. |
| 2004/0018353 A1 | 1/2004 | Czaplicki et al. |
| 2004/0033344 A1 | 2/2004 | Czaplicki et al. |
| 2004/0034982 A1 | 2/2004 | Wieber et al. |
| 2004/0046423 A1 | 3/2004 | Wieber |
| 2004/0051251 A1 | 3/2004 | Hankins et al. |
| 2004/0056472 A1 | 3/2004 | Schneider |
| 2004/0074150 A1 | 4/2004 | Wycech |
| 2004/0075299 A1 | 4/2004 | Wieber et al. |
| 2004/0076831 A1 | 4/2004 | Hable |
| 2004/0079478 A1 | 4/2004 | Merz |
| 2004/0124553 A1 | 7/2004 | Czaplicki et al. |
| 2004/0135058 A1 | 7/2004 | Wycech |
| 2005/0081383 A1 | 4/2005 | Kosal et al. |
| 2005/0082111 A1 | 4/2005 | Weber |

| | | | |
|---|---|---|---|
| 2005/0102815 A1 | 5/2005 | Larsen | |
| 2005/0126286 A1 | 6/2005 | Hable et al. | |
| 2005/0127145 A1 | 6/2005 | Czaplicki et al. | |
| 2005/0159531 A1 | 7/2005 | Ferng | |
| 2005/0166532 A1 | 8/2005 | Barz | |
| 2005/0172486 A1 | 8/2005 | Carlson et al. | |
| 2005/0194706 A1 | 9/2005 | Kosal et al. | |
| 2005/0212326 A1 | 9/2005 | Marion | |
| 2005/0212332 A1 | 9/2005 | Sheldon et al. | |
| 2005/0217785 A1 | 10/2005 | Hable et al. | |
| 2005/0218697 A1 | 10/2005 | Barz et al. | |
| 2005/0230165 A1 | 10/2005 | Thomas et al. | |
| 2005/0241756 A1 | 11/2005 | Harthcock et al. | |
| 2005/0249916 A1 | 11/2005 | Muto et al. | |
| 2005/0251988 A1 | 11/2005 | Mendiboure | |
| 2005/0260399 A1 | 11/2005 | Finerman | |
| 2005/0269840 A1 | 12/2005 | Finerman et al. | |
| 2005/0276970 A1 | 12/2005 | Busseuil et al. | |

FOREIGN PATENT DOCUMENTS

| | | |
|---|---|---|
| DE | 198 58 903 A1 | 6/2000 |
| EP | 0611778 B1 | 9/1997 |
| EP | 0 891 918 A1 | 1/1999 |
| EP | 0 893 331 A1 | 1/1999 |
| EP | 0 893 332 A1 | 1/1999 |
| EP | 1 084 816 A2 | 3/2001 |
| EP | 1 134 126 | 3/2001 |
| EP | 1 122 156 A2 | 8/2001 |
| EP | 1 031 496 | 12/2001 |
| EP | 0 893 332 B1 | 3/2002 |
| EP | 1 440 867 | 1/2003 |
| EP | 1 362 683 A2 | 11/2003 |
| EP | 1 362 769 A1 | 11/2003 |
| EP | 1 428 744 | 6/2004 |
| EP | 1 475 295 | 11/2004 |
| EP | 1 591 224 | 2/2005 |
| EP | 1 157 916 B1 | 10/2005 |
| EP | WO05/105405 | 11/2005 |
| GB | 2 375 328 A | 11/2002 |
| WO | WO 95/32110 | 11/1995 |
| WO | WO 97/02967 | 1/1997 |
| WO | WO 97/43501 | 11/1997 |
| WO | WO 98/50221 | 11/1998 |
| WO | WO 99/08854 | 2/1999 |
| WO | WO 00/03894 | 1/2000 |
| WO | WO 00/13958 | 3/2000 |
| WO | WO 00/27920 | 5/2000 |
| WO | WO 00/46461 | 8/2000 |
| WO | WO 00/55444 | 9/2000 |
| WO | WO 01/30906 A1 | 5/2001 |
| WO | WO 01/54936 A1 | 8/2001 |
| WO | WO 01/58741 | 8/2001 |
| WO | WO 01/71225 A1 | 9/2001 |
| WO | WO 01/83206 A1 | 11/2001 |
| WO | WO 01/88033 A1 | 11/2001 |
| WO | WO 02/055923 A2 | 7/2002 |
| WO | WO 03/042024 A1 | 5/2003 |
| WO | WO 03/047951 A1 | 6/2003 |
| WO | WO 03/051676 | 6/2003 |
| WO | WO 03/061934 | 7/2003 |
| WO | WO 03/089221 A1 | 10/2003 |
| WO | WO 03/093387 | 11/2003 |
| WO | WO04/067304 | 8/2004 |
| WO | WO 05/077634 | 8/2005 |
| WO | WO05/113689 | 12/2005 |

OTHER PUBLICATIONS

Copending U.S. Appl. No. 10/712,069, filed Jan. 28, 2003.
Copending U.S. Appl. No. 10/783,326, filed Mar. 4, 2003.
Copending U.K. Application Serial No. 0220945.0 filed Sep. 10, 2002.
Copending U.K. Application Serial No. 0300159.1 filed Jan. 6, 2003.
Born et al., Structural Bonding in Automotive Applications.
Hopton et al., Application of a Structural Reinforcing Material to Improve Vehicle NVH Characteristics.
Lilley et al., Comparison of Preformed Acoustic Baffles and Two-Component Polyurethane Foams for Filling Body Cavities.
Lilley et al., A Comparison of NVH Treatments for Vehicle Floorplan Applications.
Lilley et al., Vehicle Acoustic Solutions.
Mansour et al., Optimal Bonding Thickness for Vehicle Stiffness.
International Search Report dated Aug. 25. 2004. PCT/US04/011573.

* cited by examiner

STRUCTURAL REINFORCEMENT MEMBER AND METHOD OF USE THEREFOR

CLAIM OF BENEFIT OF FILING DATE

The present application claims the benefit of the filing date of U.S. Provisional Application Ser. No. 60/464,712, filed Apr. 23, 2003, hereby incorporated by reference.

FIELD OF THE INVENTION

The present invention relates generally to a structural reinforcement member and its use in a reinforced structural system.

BACKGROUND OF THE INVENTION

For many years the transportation industry has been concerned with designing structural reinforcement members that have a variety of desirable attributes. For instance, lighter weight is typically desirable. As another example, members formed of lower cost materials are typically desirable, as yet another example, members that can be more efficiently or effectively installed are also desirable. Examples of prior art reinforcing devices are disclosed in U.S. Pat. Nos. 5,755,486; 4,901,500; and 4,751,249, which are expressly incorporated herein by reference for all purposes. In the interest of continuing innovation of reinforcement members, the present invention provides an improved structural reinforcement member having one of the attributes mentioned above or other desirable attributes. The present invention also provides a method for use of the member in a reinforced structural system.

SUMMARY OF THE INVENTION

Accordingly, there is provided a structural system of an automotive vehicle or other article of manufacture. The system typically includes a structure of the article of manufacture, a reinforcement member and at least one locating member. The structure typically defines a cavity and the reinforcement member is typically located within the cavity of the structure. The reinforcement member is comprised of a carrier member that is preferably shaped as a shell having an inner surface and an outer surface. A reinforcement material is typically disposed upon the outer surface of the carrier member. The system also preferably includes at least one locating member attached to the reinforcement member wherein the at least one locating member assists in locating the reinforcement member with the cavity of the structure.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF THE PREFERRED EMBODIMENT

Figure 1:
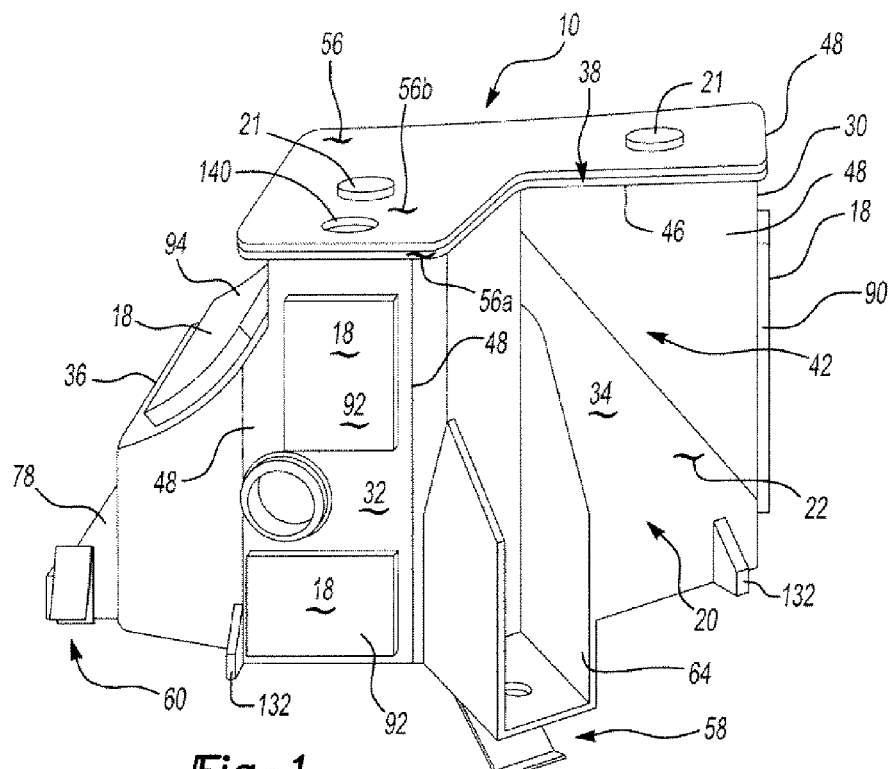
FIG. 1 is a perspective view of a structural reinforcement member according to a preferred aspect of the present invention.
Figure 2:
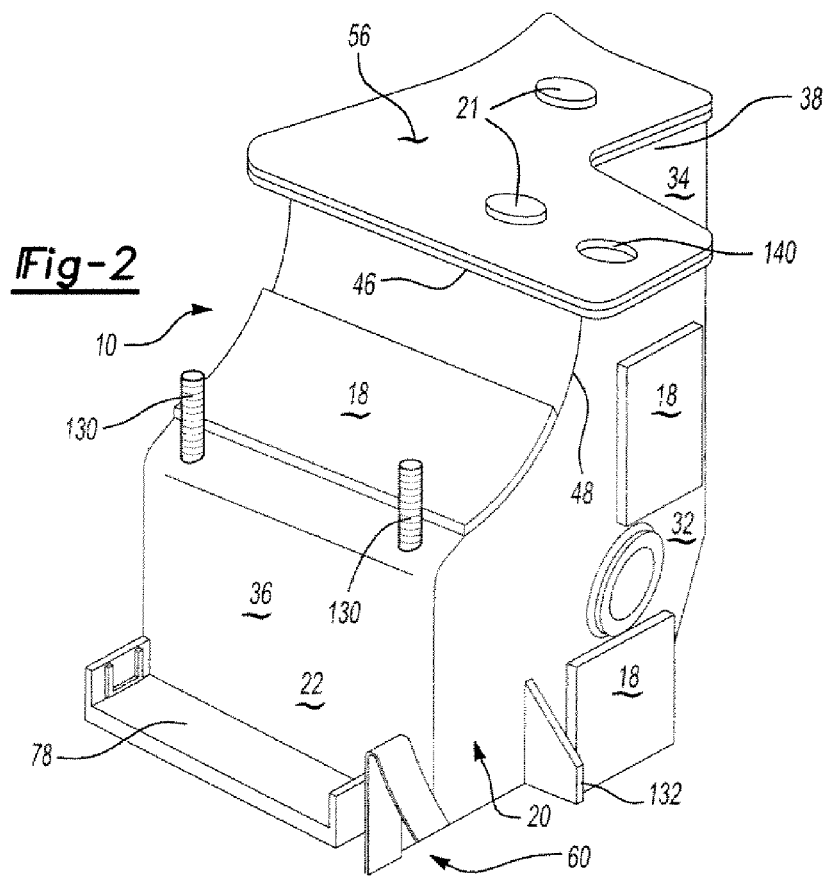
FIG. 2 is another perspective view of the structural reinforcement member of FIG. 1.
Figure 3:
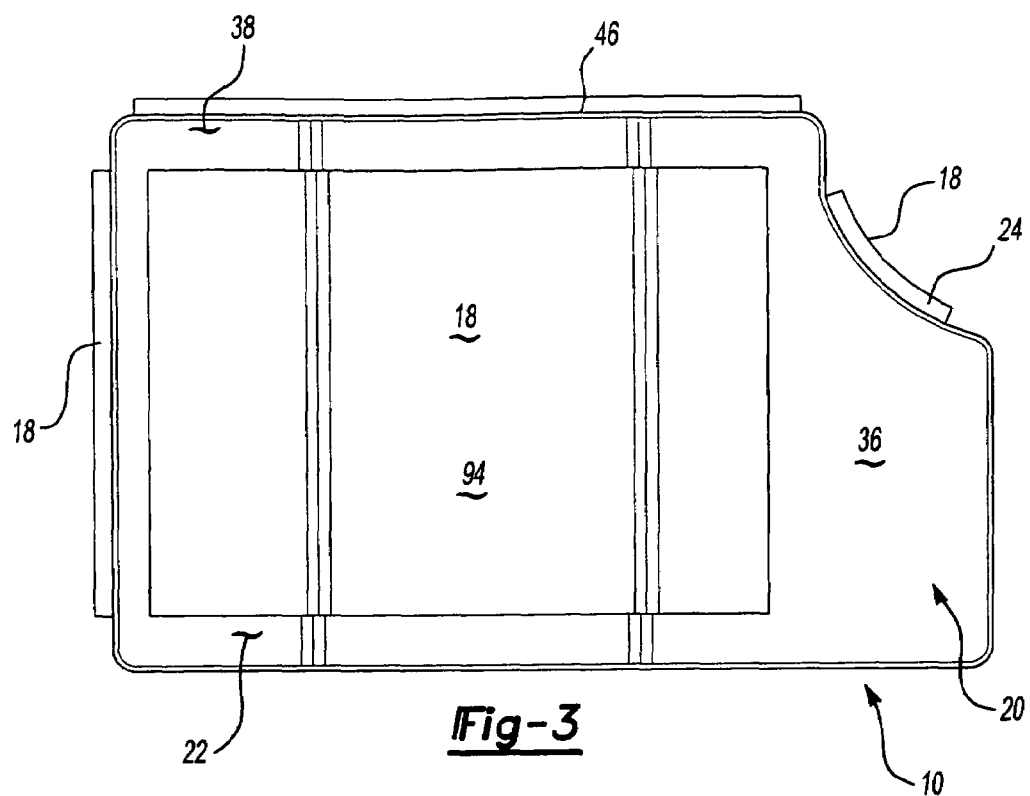
FIG. 3 is another perspective view of the structural reinforcement member of FIG. 1.
Figure 4:
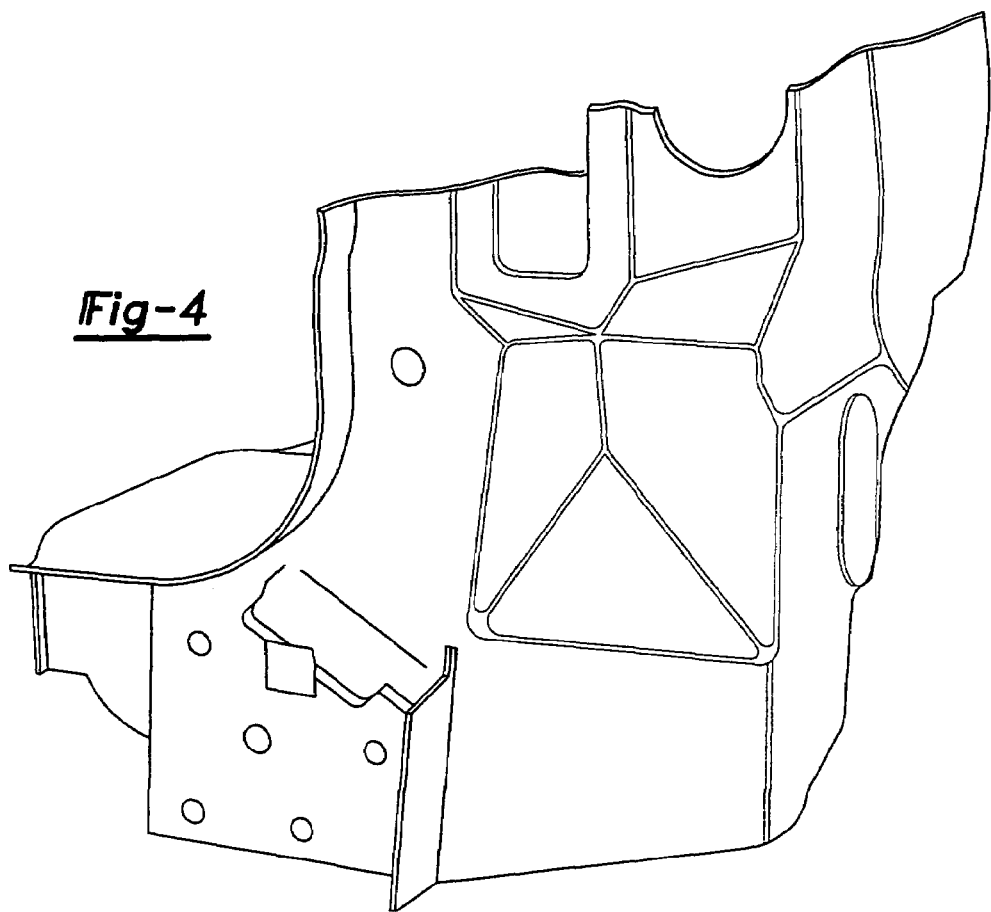
FIG. 4 is a perspective view of an automotive vehicle structure according to a preferred aspect of the present invention.
Figure 5:
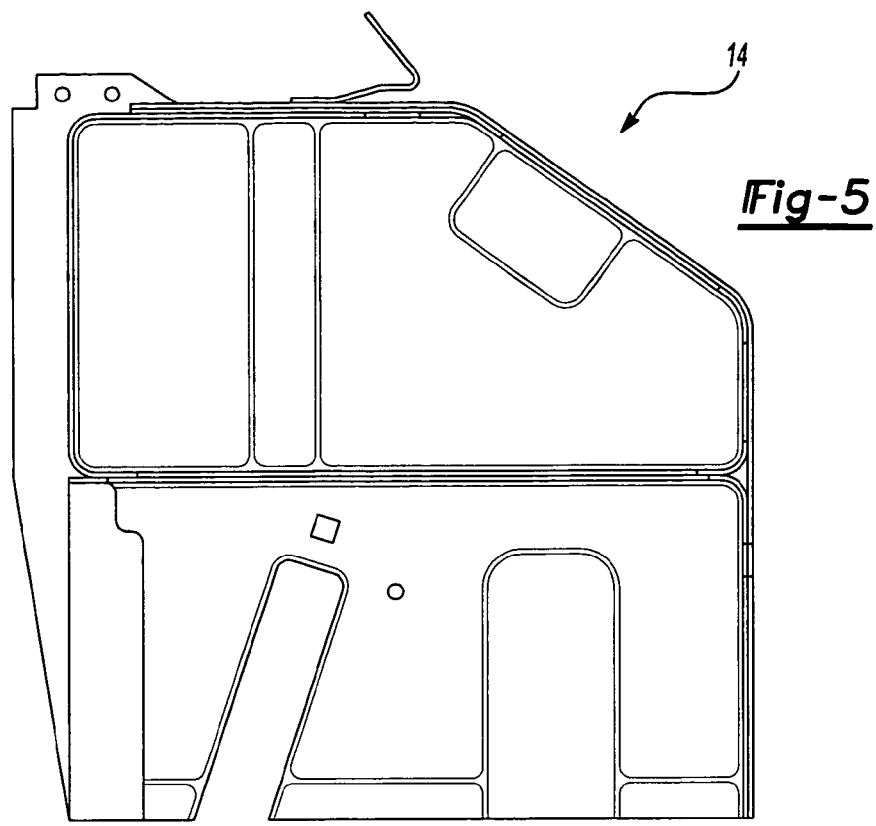
FIG. 5 is another perspective view of the automotive vehicle structure of FIG. 4.

The present invention is predicated upon the provision of a structural reinforcement member and its use in forming a structural reinforcement system within an article of manufacture. The structural reinforcement member has been found particularly useful for reinforcing portions of automotive vehicles, however, it is contemplated that the member may be employed in a variety of articles of manufacture such as buildings, furniture, watercraft or the like.

Typically, a structural reinforcement member according to the present invention will include a carrier member with a reinforcement material disposed thereon. It is also contemplated, however, that the carrier member may be utilized without the reinforcement material. In a preferred embodiment, the carrier member is formed as a shell having an outer surface and at least one inner surface with the inner surface at least partially defining a cavity extending into the main body of the carrier member.

The carrier member may be provided in a variety of shapes and configurations. For example, and without limitation, the carrier member and the reinforcement member may include portions that are cylindrical, rectangular, contoured, angled, bent, curved, planar, non-planar, flat, combinations thereof or the like. Moreover, the carrier member may be integrally formed of a singular material or it may be formed as separate components that are fastened together to form an integral carrier member.

Advantageously, the reinforcement member of the present invention may include one or more components for assisting in assembly of the reinforcement member to a structure of an article of manufacture such as an automotive vehicle. Moreover, the reinforcement member may be particularly suitable for assembly to particular types of structures. Additional advantages will become apparent upon reading the following description.

FIGS. 1–3, 8 and 10 illustrate an example of a structural reinforcement member 10, which is configured for placement within a cavity 12 of a structure 14 of an automotive vehicle (not shown) for forming a reinforced structural system 16 of the vehicle. As will be appreciated, the member 10 may be suited for placement in a variety of cavities for reinforcing a variety of components of the automotive vehicle.

The reinforcement member 10 typically includes a reinforcement material 18 disposed upon a carrier member 20. Preferably, the carrier member 20 is formed as a shell having an outer surface 22 and at least one inner surface 24. As such, the inner surface 24 preferably defines a cavity 26 extending into the main body of the carrier member 20.

As shown, the carrier member 20 is generally L-shaped and includes a plurality of surfaces, which may be contoured, angled, arced or otherwise shaped. Although the shapes and contours of the carrier member 20 are described in some detail below, it should be understood that the shapes and contours may be changed as needed or desired and depending upon the structure to which the carrier member 20 is applied.

In the exemplary embodiment illustrated, the outer surface 22 of the carrier member 20 is illustrated as having a first end surface 30 and a second end surface 32 and plurality of surfaces 34, 36, 38 extending at least partially from the first end surface 30 to the second end surface 32. In the particular embodiment depicted, the plurality of surfaces 34, 36, 38 includes a first side surface 34 that is shown as generally concave for defining a cavity 42, a second side surface 36 that is shown as generally convex and an upper or top surface 38 that is generally L-shaped.

Preferably, the first side surface 34 is in substantially spaced apart and opposed relation to the second side surface 36 with the top surface 38 and the end surface 30, 32 extending between peripheral edges 46, 48 of the side surfaces 34, 36. In the embodiment shown, the peripheral edges 46, 48 may be divided into upper edges 46 and side edges 48.

The inner surface 24 may be shape or configured as desired to form the cavity 26 extending into the carrier member 20. In the exemplary embodiment illustrated, the inner surface 24 is configured to be substantially opposite the entire outer surface 22 such that a relatively low section thickness may be maintained throughout substantially the entire carrier member 20 for lowering weight.

As used herein, section thickness is defined as the shortest distance from a point on the inner surface of the carrier member to the closest point on the outer surface. Thus, in one embodiment, it is contemplated that at least about 70% of the carrier member has a thickness no greater than about 1.5 centimeters, more preferably at least about 80% of the carrier has a thickness of no greater than about 1 centimeter and still more preferably at least about 95% of the carrier has a thickness of no greater than about 5 millimeters.

One or more positioning (e.g., fastening or locating) members may be attached to (e.g., integrally formed with) the carrier member 20 and the positioning members may extend from a variety of location upon the carrier member 20. In the embodiment shown, the carrier member 20 supports three positioning members including a first locating member 56, a second locating member 58 and a fastening member 60.

The first locating member 56 is an at least partially flexible panel member. As shown, the first locating member 56 is formed of a plastic (e.g., a cellular, non-cellular or microcellular plastic) layer 56a that is overlayed by an expandable (e.g., foamable) sealer material 56b, which may be the same as, similar to or different from the reinforcement materials described herein. It is further contemplated, however, that the first locating member 56 may be formed of a variety of materials including elastomers, plastics, fibrous materials, fabrics, cardboard, paper products, combinations thereof or the like. The first locating member 56 is attached to at least one surface of the carrier member 20, which, as shown, is the top surface 38 of the carrier member 20. In particular, the first locating member 56 overlays at least a portion and preferably substantially all of the top surface 38. The first locating member 56 may be attached adjacent to the top surface with a variety of fasteners such as mechanical fasteners 21 (e.g., push pins), adhesives, integral interlocking members, combinations thereof or the like.

The second locating member 58 in the exemplary embodiment is a spring mechanism formed of bent sheet metal. As shown, the second locating member 58 is attached (e.g., adhered, mechanically fastened, integrally molded) to a flange 64 that extends from the first side surface 34 of the carrier member 20. Preferably, the second locating member 58 and the flange 64 are adjacent a peripheral edge surface 72 of the carrier member 20 that substantially separates the inner surface 24 of the carrier member 20 from the outer surface 22.

The fastening member 60 in the exemplary embodiment is a piece of bent sheet metal formed as a hook and is attached (e.g., adhered, mechanically fastened, integrally molded) to a flange 78 extending from the second side surface 36 of the carrier member 20. Preferably the fastening member 60 and the flange 78 are adjacent the peripheral edge surface 72 of the carrier member 20.

The carrier member or at least portions thereof could be formed of injection molded nylon, injection molded polymer, or molded or otherwise-shaped metal (such as aluminum, magnesium, steel and titanium, an alloy derived from the metals, and even a metallic foam). Preferably, the carrier member is formed of a molding compound such as a sheet molding compound (SMC), a bulk molding compound (BMC), a thick molding compound (TMC) or the like. The formation of carrier members from molding compound is discussed in U.S. Provisional Patent Application Ser. No. 60/443,108, filed Jan. 28, 2003, which is incorporated herein by reference for all purposes.

As shown, the carrier member 20 is integrally formed (e.g., molded) as a single piece. However, it is contemplated that the carrier member 20 may be formed in multiple pieces that are attached together. Also, as shown, the cavity 26 formed by the inner surface 24 of the carrier member 20 is empty, but it may be filled with a material such as a foam core, a polymeric material or any one of the reinforcement materials or carrier member materials disclosed herein or other materials.

The reinforcement material 18 may be disposed upon the carrier member 20 as need or desired. In the particular embodiment shown, a strip 90 of reinforcement material 18 is located on the first end surface 30, two strips 92 are located upon the second end surface 32 and one or more strips 94 are located upon the second side surface 36.

The reinforcement material may be formed of several different materials. Generally speaking, the present invention may utilize technology and processes for the forming and applying the reinforcement material such as those disclosed in U.S. Pat. Nos. 4,922,596, 4,978,562, 5,124,186, and 5,884,960 and commonly owned, co-pending U.S. application Ser. No. 09/502,686 filed Feb. 11, 2000 and Ser. No. 09/524,961 filed Mar. 14, 2000, all of which are expressly incorporated by reference for all purposes. Preferably, the reinforcement material is formed of a high compressive strength and stiffness heat activated reinforcement material having foamable characteristics. The material may be generally dry to the touch or tacky and can be placed upon a carrier member or the like in any form of desired pattern, placement, or thickness, but is preferably of substantially uniform thickness. One exemplary reinforcement material is L-5218 structural foam available through L&L Products, Inc. of Romeo, Mich.

Though other heat-activated materials are possible for the reinforcement material, a preferred heat activated material is an expandable polymer or plastic, and preferably one that is foamable with adhesive characteristics. A particularly preferred material is an epoxy-based structural foam. For example, and without limitation, the structural foam may be an epoxy-based material, including an ethylene copolymer or terpolymer that may possess an alpha-olefin. As a copolymer or terpolymer, the polymer is composed of two or three different monomers, i.e., small molecules with high chemical reactivity that are capable of linking up with similar molecules.

A number of epoxy-based structural reinforcing or sealing foams are known in the art and may also be used to produce the structural foam. A typical structural foam includes a polymeric base material, such as an epoxy resin or ethylene-based polymer which, when compounded with appropriate ingredients (typically a blowing and curing agent), expands and cures in a reliable and predictable manner upon the application of heat or the occurrence of a particular ambient condition. From a chemical standpoint for a thermally-activated material, the structural foam is usually initially processed as a flowable thermoplastic material before curing. It will cross-link upon curing, which makes the material incapable of further flow.

An example of a preferred structural foam formulation is an epoxy-based material that is commercially available from L&L Products of Romeo, Mich, under the designations L5206, L5207, L5208, L-5248, L5218. One advantage of the preferred structural foam materials over prior art materials is that the preferred materials can be processed in several ways. The preferred materials can be processed by injection molding, extrusion compression molding or with a mini-applicator. This enables the formation and creation of part designs that exceed the capability of most prior art materials. In one preferred embodiment, the structural foam (in its uncured state) generally is dry or relatively free of tack to the touch and can easily be attached to the carrier member through fastening means which are well known in the art.

While the preferred materials for fabricating the reinforcement material have been disclosed, the reinforcement material can be formed of other materials provided that the material selected is heat-activated or otherwise activated by an ambient condition (e.g. moisture, pressure, time or the like) and cures in a predictable and reliable manner under appropriate conditions for the selected application. One such material is the epoxy based resin disclosed in U.S. Pat. No. 6,131,897, the teachings of which are incorporated herein by reference, filed with the United States Patent and Trademark Office on Mar. 8, 1999 by the assignee of this application. Some other possible materials include, but are not limited to, polyolefin materials, copolymers and terpolymers with at least one monomer type an alpha-olefin, phenol/formaldehyde materials, phenoxy materials, and polyurethane materials with high glass transition temperatures. See also, U.S. Pat. Nos. 5,766,719; 5,755,486; 5,575,526; and 5,932,680, (incorporated by reference). In general, the desired characteristics of the reinforcement material 30 include relatively high stiffness, high strength, high glass transition temperature (typically greater than 70 degrees Celsius), and adhesion durability properties. In this manner, the material does not generally interfere with the materials systems employed by automobile manufacturers. Exemplary materials include materials sold under product designation L5207, L-5248 and L5208, which are commercially available from L & L Products, Romeo, Mich.

In applications where the reinforcement material is a heat activated, thermally expanding material, an important consideration involved with the selection and formulation of the material comprising the structural foam is the temperature at which a material reaction or expansion, and possibly curing, will take place. For instance, in most applications, it is undesirable for the material to be reactive at room temperature or otherwise at the ambient temperature in a production line environment. More typically, the structural foam becomes reactive at higher processing temperatures, such as those encountered in an automobile assembly plant, when the foam is processed along with the automobile components at elevated temperatures or at higher applied energy levels, e.g., during paint curing steps. While temperatures encountered in an automobile assembly operation may be in the range of about 148.89° C. to 204.44° C. (about 300° F. to 400° F.), body and paint shop applications are commonly about 93.33° C. (about 200° F.) or slightly higher. If needed, blowing agent activators can be incorporated into the composition to cause expansion at different temperatures outside the above ranges.

Generally, suitable expandable foams have a range of expansion ranging from approximately 0 to over 1000 percent. The level of expansion of the reinforcement material may be increased to as high as 1500 percent or more. Typically, strength and stiffness are obtained from products that possess low expansion.

Some other possible materials for the reinforcement material 30 include, but are not limited to, polyolefin materials, copolymers and terpolymers with at least one monomer type an alpha-olefin, phenol/formaldehyde materials, phenoxy materials, and polyurethane. See also, U.S. Pat. Nos. 5,266,133; 5,766,719; 5,755,486; 5,575,526; 5,932,680; and WO 00/27920 (PCT/US 99/24795) (all of which are expressly incorporated by reference). In general, the desired characteristics of the resulting material include relatively low glass transition point, and good adhesion durability properties. In this manner, the material does not generally interfere with the materials systems employed by automobile manufacturers. Moreover, it will withstand the processing conditions typically encountered in the manufacture of a vehicle, such as the e-coat priming, cleaning and degreasing and other coating processes, as well as the painting operations encountered in final vehicle assembly.

In another embodiment, the reinforcement material is provided in an encapsulated or partially encapsulated form, which may comprise a pellet, which includes an expandable foamable material, encapsulated or partially encapsulated in an adhesive shell. An example of one such system is disclosed in commonly owned, co-pending U.S. application Ser. No. 09/524,298 ("Expandable Pre-Formed Plug"), hereby incorporated by reference.

In addition, as discussed previously, preformed patterns may also be employed such as those made by extruding a sheet (having a flat or contoured surface) and then die cutting it according to a predetermined configuration in accordance with the chosen pillar structure, door beam, carrier member or the like, and applying it to thereto.

The skilled artisan will appreciate that the system may be employed in combination with or as a component of a conventional sound blocking baffle, or a vehicle structural reinforcement system, such as is disclosed in commonly owned co-pending U.S. application Ser. Nos. 09/524,961 or 09/502,686 (hereby incorporated by reference).

It is contemplated that the material of the reinforcement material could be delivered and placed into contact with the assembly members, through a variety of delivery systems which include, but are not limited to, a mechanical snap fit assembly, extrusion techniques commonly known in the art as well as a mini-applicator technique as in accordance with the teachings of commonly owned U.S. Pat. No. 5,358,397 ("Apparatus For Extruding Flowable Materials"), hereby expressly incorporated by reference. In this non-limiting embodiment, the material or medium is at least partially coated with an active polymer having damping characteristics or other heat activated polymer, (e.g., a formable hot melt adhesive based polymer or an expandable structural foam, examples of which include olefinic polymers, vinyl polymers, thermoplastic rubber-containing polymers, epoxies, urethanes or the like) wherein the foamable or reinforcement material can be snap-fit onto the chosen surface or substrate; placed into beads or pellets for placement along the chosen substrate or member by means of extrusion; placed along the substrate through the use of baffle technology; a die-cast application according to teachings that are well known in the art; pumpable application systems which could include the use of a baffle and bladder system; and sprayable applications.

In still another embodiment, it is contemplated that the reinforcement material may be applied to the carrier member while the carrier member is at an elevated temperature. As such the reinforcement material will adhere to the carrier member as described in U.S. Provisional Patent Application Ser. No. 60/443,108, already incorporated by reference.

For assembling the reinforcement member to an article of manufacture, reference will be made to FIGS. 4–10. In FIGS. 4–10, the reinforcement member 10 is illustrated as it is assembled to a structure 14 of an automotive vehicle, although the skilled artisan will recognize that the reinforcement member 10 taught by the present invention may be applied to a variety of articles. The structure 14 is illustrated as a D-pillar of the automotive vehicle, but again, it shall be recognized that the reinforcement member may be applied to various structures of the automotive vehicle such as A, B, or C-pillars, frame structure, body structures, roof assemblies, bumpers, closure devices or the like.

Figure 6:
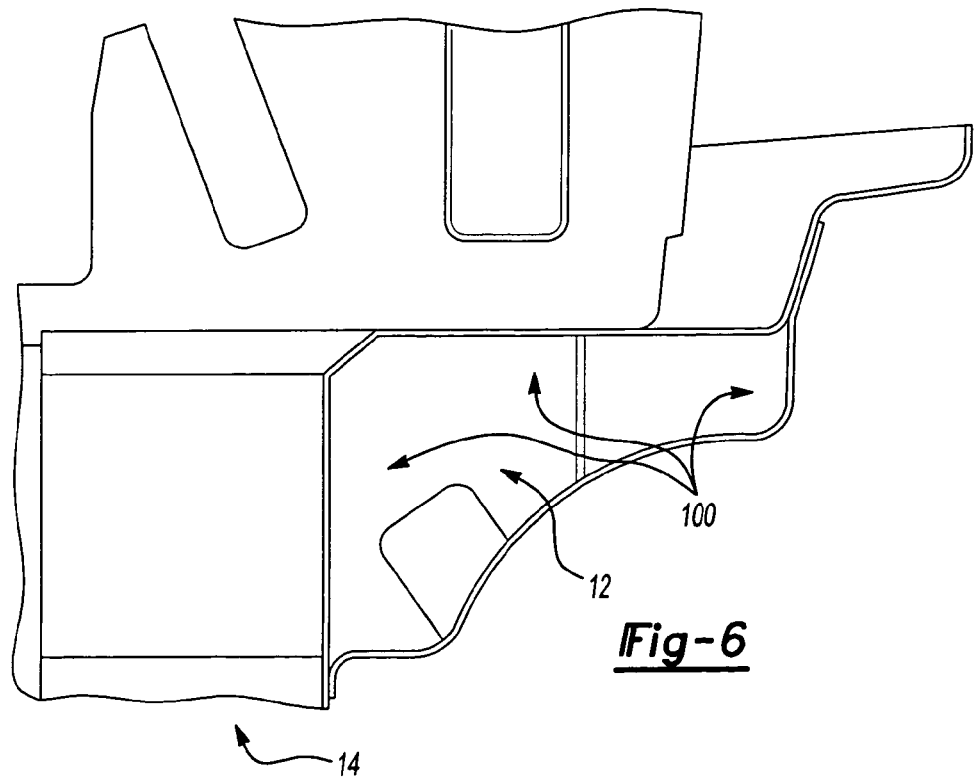
FIG. 6 is another perspective view of the automotive vehicle structure of FIG. 4.
Figure 7:
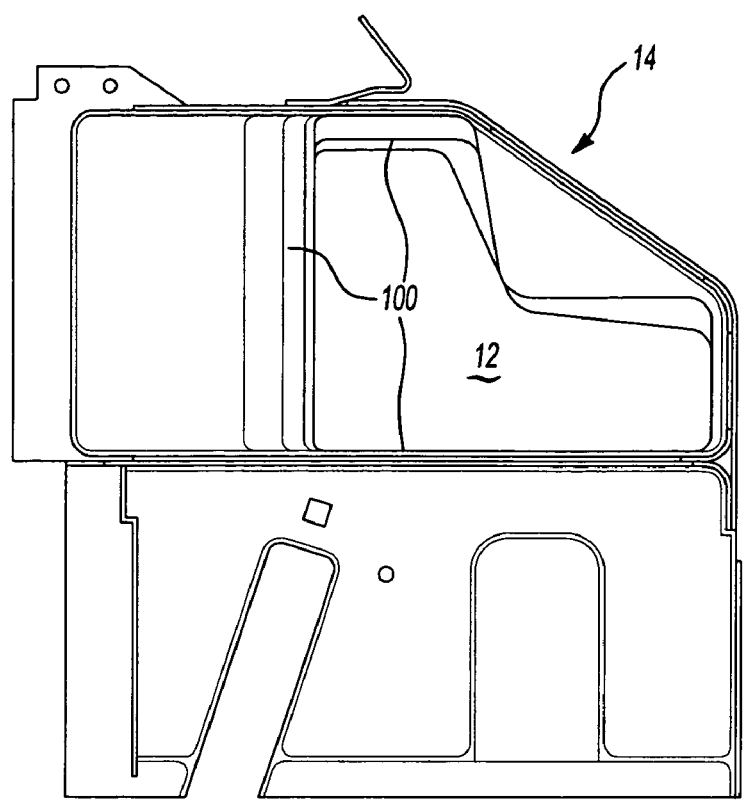
FIG. 7 is another perspective view of the automotive vehicle structure of FIG. 4.
Figure 8:
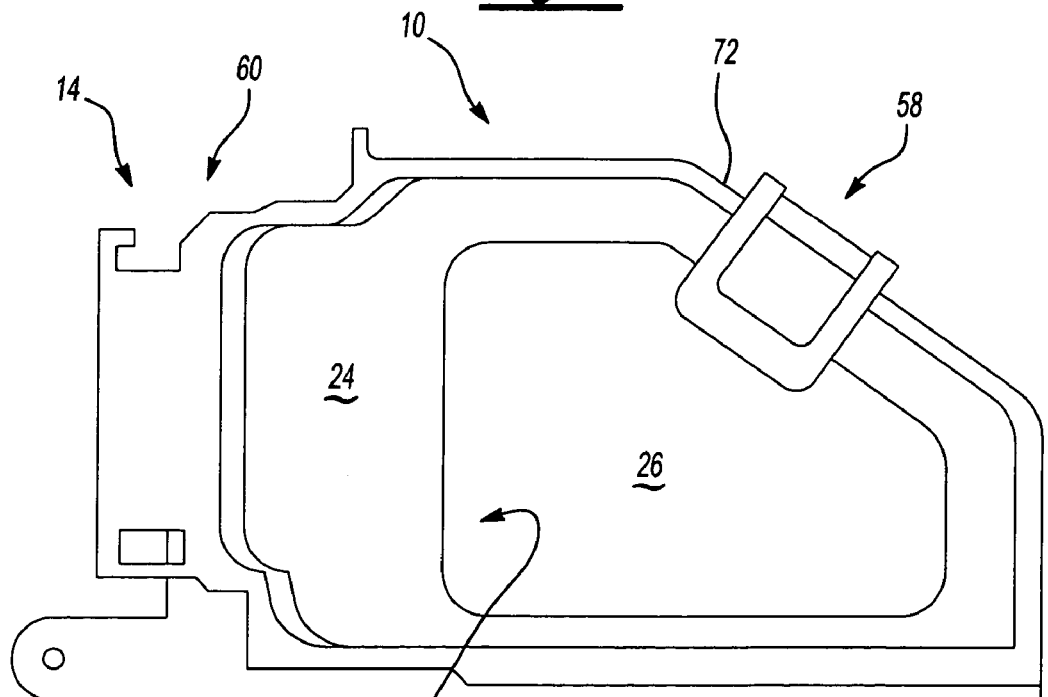
FIG. 8 is a perspective view of a structural system being formed in accordance with a preferred aspect of the present invention.
Figure 9:
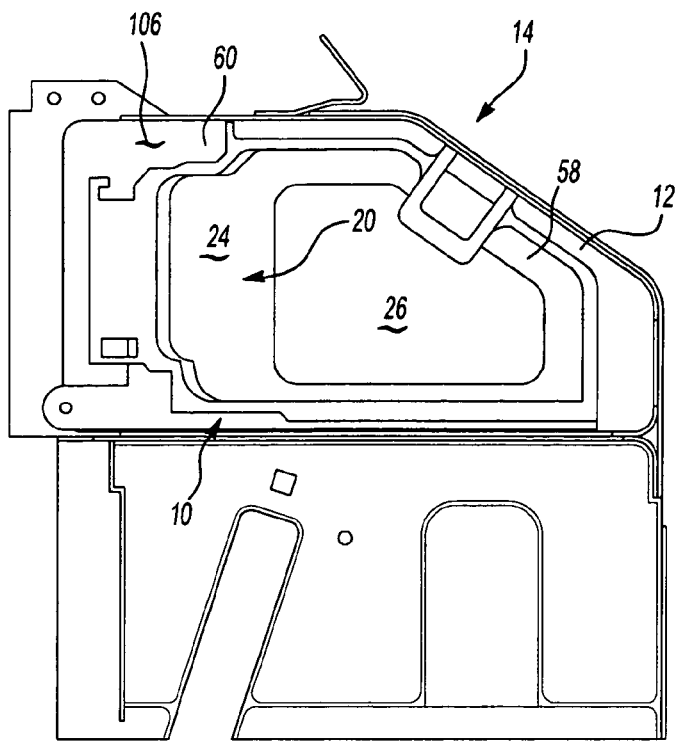
FIG. 9 is another perspective view of the structural system of FIG. 8 being formed in accordance with a preferred aspect of the present invention.

In FIGS. 6 and 7, there is illustrated respectively, a top perspective view and a bottom perspective view showing that the structure 14 include a plurality of walls 100 defining the cavity 12 within the structure 14. As shown in FIGS. 8 and 9, the reinforcement member 10 is inserted into the cavity 12 through the bottom of the structure 14 until the fastening member 60 is interference fit (e.g., in overlapping relation) with a protrusion 106 (e.g., a flange) of the structure 14. In the embodiment illustrated, the fastening member 60 is only temporarily interference fit with the protrusion 106. However, it is contemplated that a more permanent fit may be established. As shown, the carrier member 20, the reinforcement member 10 or both and particularly, the outer surface 22 of the carrier member 20 are shaped to correspond to the shape of the cavity 12 as defined by the walls 100 of the structure 14.

Figure 10:
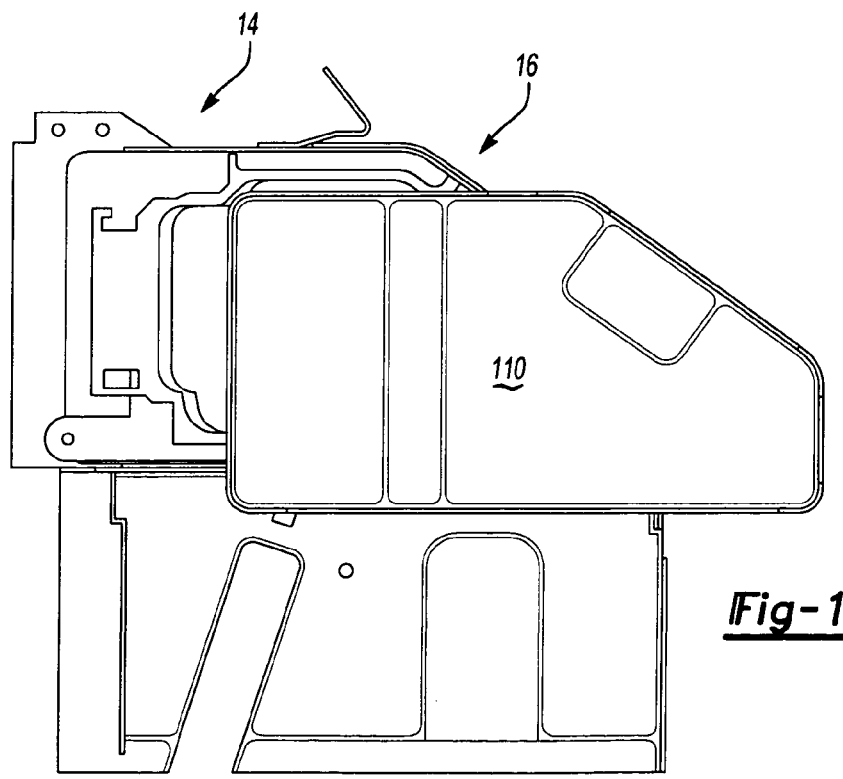
FIG. 10 is another perspective view of the structural system of FIG. 8 being formed in accordance with a preferred aspect of the present invention.

After initial insertion into the cavity 12, and referring to FIG. 10, a member shown as a panel portion 110 is assembled to the bottom portion of the structure 14 thereby substantially enclosing the cavity 12. As the panel portion 110 is assembled to the bottom portion of the structure 14, the second locating member 58 is preferably flexed such that the reinforcement member 10 is further inserted into the cavity 12. At substantially the same time or at a close proximity in time, the fastening member 60 is moved away from the protrusion 106 and the first locating member 56 contacts the walls 100 of the structure 14 to situate or locate the reinforcement member 10 in the cavity 12 as desired. Advantageously, the locating member 58, by flexing, can assist the reinforcement in adapting to tolerances and/or build variations, which may be presented by the structure 14.

It is contemplated that one or more additional locating members 130, 132 (e.g., rods or flanges) may be included on the carrier member 20 for contacting the walls 100 and locating the reinforcement member 10 upon full insertion into the cavity 12. In the embodiment shown, the member includes two flanges 132 and two rods 130. As an alternative embodiment, the two rods 130 illustrated may be replaced by a flange that partially or fully extends the distance shown as being between the two rods 130.

It is also contemplated that the reinforcement member may include a marker 140 for assuring that the reinforcement member 10 has been properly inserted within the cavity 12. In the embodiment shown, an opening 140 has been formed in the sealer material 56b such that the opening 140 can be detected by a sensor to assure proper location of the member 10 within the cavity 12.

Upon installation, the reinforcement material 18, the expandable (e.g., foamable) sealer material 56b may expand (e.g., by heat activation in a e-coat or paint oven) and adhere to the walls 100 of the structure 14 thereby forming the reinforced structural system 16 formed of the structure 14 and the reinforcement member 10. In operation, the reinforcement member 10 provides substantial reinforcement to the structure 14 at a relatively low cost and without significantly adding to the weight of the system 16.

Typically, the expandable sealer material 56b seals the cavity 12 of the structure 14 to prevent passage of materials therethrough, although not required. Thus, the member 56 can function as a baffle and can physically substantially separate portions of the cavity from each other. As such, the reinforcement member may be a reinforcement/baffling system.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. A structural system of an automotive vehicle, the system comprising:
   a structure of the automotive vehicle, the structure defining a cavity;
   a reinforcement member located within the cavity of the structure, the reinforcement member including:
   i. a carrier member formed as a shell and having an inner surface and an outer surface; and
   ii. a reinforcement material disposed upon the outer surface of the carrier member; and
   at least one locating member attached to the reinforcement member, the at least one locating member assisting in locating the reinforcement member with the cavity of the structure;

wherein the at least one locating member is attached to the carrier member with a mechanical fastener or an adhesive; and wherein at least 80% of the carrier has a section thickness of no greater than 1 centimeter.

2. A structural system as in claim 1 wherein a sealant material is disposed upon the at least one locating member.

3. A structural system as in claim 1 wherein the at least one locating member includes a panel that overlays a surface of the reinforcement member.

4. A structural system as in claim 1 wherein the at least one locating member includes a spring mechanism.

5. A structural system as in claim 1 wherein the at least one locating member is integrally formed with the carrier member.

6. A structural system as in claim 1 wherein the carrier member is formed of a molding compound selected from sheet molding compound, bulk molding compound and thick molding compound.

7. A structural system as in claim 1 wherein the at least one locating member includes at least three locating members.

8. A structural system as in claim 1 wherein the outer surface of the carrier member includes a concave side surface and a convex side surface.

9. A structural system as in claim 1 wherein the at least one locating member functions as a baffle and physically substantially separates portions of the cavity from each other.

10. A structural system as in claim 1 wherein the reinforcement material is configured to foam upon exposure to heat in an e-coat or paint oven.

11. A structural system of an automotive vehicle, the system comprising:
   a structure of the automotive vehicle, the structure defining a cavity;
   a reinforcement member located within the cavity of the structure, the reinforcement member including:
      i. a carrier member formed as a shell and having an inner surface and an outer surface; and
      ii. a reinforcement material disposed upon the outer surface of the carrier member; and
   at least one locating member attached to the reinforcement member, the at least one locating member assisting in locating the reinforcement member with the cavity of the structure;
   wherein the at least one locating member includes a panel that overlays a surface of the reinforcement member; and
   wherein at least 80% of the carrier has a section thickness of no greater than 1 centimeter.

12. A structural system as in claim 11 wherein the structure is a pillar of the automotive vehicle and wherein the at least one locating member includes a first locating member and a second locating member and the second locating member includes a spring mechanism and the second locating member flexes while the first locating member contacts walls of the structure for locating the reinforcement member in the cavity.

13. A structural system as in claim 11 wherein a sealant material is disposed upon the at least one locating member.

14. A structural system as in claim 11 wherein the at least one locating member is integrally formed with the carrier member.

15. A structural system as in claim 11 wherein the carrier member is formed of a molding compound selected from sheet molding compound, bulk molding compound and thick molding compound.

16. A structural system as in claim 13 wherein the at least one locating member functions as a baffle and physically substantially separates portions of the cavity from each other.

17. A structural system of an automotive vehicle, the system comprising:
   a structure of the automotive vehicle, the structure defining a cavity;
   a reinforcement member located within the cavity of the structure, the reinforcement member including:
      i. a carrier member having an outer surface; and
      ii. a reinforcement material disposed upon the outer surface of the carrier member; and
   at least one baffle member attached to the reinforcement member, the at least one baffle member being shaped as a panel and including a sealant material disposed thereon wherein the sealant material is expanded to seal the cavity against passage of materials therethrough and the baffle member physically separates portions of the cavity from each other and wherein the sealant material is different from the reinforcement material and wherein the baffle member overlays at least one surface of the carrier member.

18. A reinforced structural system as in claim 17 wherein the at least one baffle member is integrally formed with the carrier member.

19. A structural system as in claim 17 wherein the carrier member is formed of a molding compound selected from sheet molding compound, bulk molding compound and thick molding compound.

20. A structural system as in claim 17 wherein the sealant material is configured to foam upon exposure to heat in an e-coat or paint oven.

21. A reinforced structural system as in claim 17 wherein at least about 80% of the carrier has a section thickness of no greater than 1 centimeter.

22. A reinforced structural system as in claim 17 wherein the at least one locating member is at least partially formed of a microcellular plastic material.

23. A reinforced structural system as in claim 17 wherein the baffle member contacts the walls of the structure for assisting in locating the reinforcement member within the cavity of the structure.

24. A reinforced structural system as in claim 17 wherein the sealant material of the baffle member overlays substantially the entirety of a panel member of the baffle member.

25. A reinforced structural system as in claim 17 wherein the baffle member is a first locating member and the system additionally includes a second locating member that includes a spring mechanism, which flexes as the first locating member contacts walls of the structure for locating the reinforcement in the cavity.

26. A reinforced structural system as in claim 17 wherein the carrier member is formed as a shell and has an inner surface defining a cavity extending into a substantial portion of the carrier.

27. A structural system of an automotive vehicle, the system comprising:
   a structure of the automotive vehicle, the structure defining a cavity;
   a reinforcement member located within the cavity of the structure, the reinforcement member including:

i. a carrier member formed as a shell and having an inner surface and an outer surface; and ii. a reinforcement material disposed upon the outer surface of the carrier member; and at least one locating member attached to the reinforcement member, the at least one locating member assisting in locating the reinforcement member with the cavity of the structure;

wherein the at least one locating member includes a panel that overlays a surface of the reinforcement member; wherein the structure is a pillar of the automotive vehicle and wherein the at least one locating member includes a first locating member and a second locating member and the second locating member includes a spring mechanism and the second locating member flexes while the first locating member contacts walls of the structure for locating the reinforcement member in the cavity.

* * * * *